United States Patent
Haddad et al.

(10) Patent No.: US 10,056,685 B2
(45) Date of Patent: Aug. 21, 2018

(54) ANTENNA ARRAY SELF-CALIBRATION

(71) Applicant: Samsung Electronics Co., Ltd., Suwon-si, Gyeonggi-do (KR)

(72) Inventors: Khalil Haddad, Allen, TX (US); Robert W. Monroe, Melissa, TX (US); Yang Li, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 743 days.

(21) Appl. No.: 14/575,661

(22) Filed: Dec. 18, 2014

(65) Prior Publication Data

US 2015/0255868 A1    Sep. 10, 2015

Related U.S. Application Data

(60) Provisional application No. 61/948,767, filed on Mar. 6, 2014.

(51) Int. Cl.

| | |
|---|---|
| *H01Q 3/00* | (2006.01) |
| *H01Q 3/26* | (2006.01) |
| *H04B 17/12* | (2015.01) |
| *H04B 17/21* | (2015.01) |

(52) U.S. Cl.
CPC ............ *H01Q 3/267* (2013.01); *H04B 17/12* (2015.01); *H04B 17/21* (2015.01)

(58) Field of Classification Search
CPC ......... H01Q 3/267; H04B 17/12; H04B 17/21
USPC ............................ 342/368, 372, 373; 725/72
See application file for complete search history.

(56) References Cited

U.S. PATENT DOCUMENTS

| | | | | |
|---|---|---|---|---|
| 5,248,982 | A | * 9/1993 | Reinhardt | H01Q 3/267 342/174 |
| 6,127,966 | A | 10/2000 | Erhage | |
| 6,133,868 | A | * 10/2000 | Butler | H01Q 3/267 342/165 |

(Continued)

FOREIGN PATENT DOCUMENTS

| | | |
|---|---|---|
| CN | 101064902 A | 10/2007 |
| CN | 101729140 A | 6/2010 |

(Continued)

OTHER PUBLICATIONS

International Search Report dated May 27, 2015 in connection with PCT/KR2015/002191; 3 pages.

(Continued)

*Primary Examiner* — Chuong P Nguyen

(57) ABSTRACT

A method and apparatus for calibrating an antenna array. The apparatus includes first and second couplers, a calibration transceiver, and a controller. The first coupler operably is connected to a first number of antennas. The second coupler is operably connected to a second number of antennas. The calibration transceiver is operably connected to the first and second couplers via a common path. The controller is configured to perform calibration on at least one or more transmit/receive paths for the second number of antennas based on at least one or more signals received from or transmitted to the first and second couplers via the common path by the calibration transceiver. The first and second numbers of antennas may each include only one antenna, or the first and second numbers of antennas may each be a group of multiple antennas.

20 Claims, 13 Drawing Sheets

(56) References Cited

U.S. PATENT DOCUMENTS

| | | | |
|---|---|---|---|
| 6,157,340 A * | 12/2000 | Xu | H01Q 3/2605 342/174 |
| 6,157,343 A | 12/2000 | Andersson et al. | |
| 6,339,399 B1 * | 1/2002 | Andersson | H01Q 3/267 342/174 |
| 6,496,140 B1 | 12/2002 | Alastalo | |
| 6,697,017 B1 * | 2/2004 | Shmuel | G01S 3/043 342/378 |
| 6,950,631 B2 * | 9/2005 | Solbach | H01Q 3/26 342/368 |
| 7,230,570 B2 * | 6/2007 | Thomas | H01Q 1/246 342/372 |
| 7,764,935 B2 | 7/2010 | Pallonen et al. | |
| 7,965,991 B2 | 6/2011 | Nash et al. | |
| 8,019,285 B2 * | 9/2011 | Nakamura | G01S 3/46 455/267 |
| 8,154,452 B2 * | 4/2012 | Webb | H01Q 3/267 342/174 |
| 8,193,971 B2 | 6/2012 | Vook et al. | |
| 8,260,234 B2 * | 9/2012 | Chae | H04B 17/00 455/115.1 |
| 9,113,346 B2 * | 8/2015 | Pivit | H01Q 3/267 |
| 9,172,454 B2 * | 10/2015 | Harel | H04B 7/0671 |
| 9,762,283 B2 * | 9/2017 | Chen | H04B 1/48 |
| 2001/0016505 A1 | 8/2001 | Rexberg et al. | |
| 2003/0160719 A1 * | 8/2003 | Hancock | H01Q 3/267 342/368 |
| 2004/0048584 A1 | 3/2004 | Vaidyanathan et al. | |
| 2005/0012658 A1 | 1/2005 | Eriksson | |
| 2005/0140546 A1 * | 6/2005 | Park | G01S 7/4008 342/368 |
| 2005/0239506 A1 | 10/2005 | Li | |
| 2006/0044185 A1 * | 3/2006 | Jin | H04B 17/21 342/368 |
| 2008/0012748 A1 * | 1/2008 | Ahn | H01Q 3/267 342/21 |
| 2009/0191819 A1 * | 7/2009 | Chae | H04B 17/00 455/67.14 |
| 2010/0321233 A1 * | 12/2010 | Ben-Zur | H01Q 3/267 342/174 |
| 2011/0053646 A1 | 3/2011 | Kundmann et al. | |
| 2011/0134972 A1 | 6/2011 | Zhu et al. | |
| 2012/0020392 A1 | 1/2012 | O'Keeffe et al. | |
| 2012/0020396 A1 | 1/2012 | Höhne et al. | |
| 2012/0065838 A1 | 3/2012 | Miao et al. | |
| 2012/0213214 A1 | 8/2012 | Vermani et al. | |
| 2013/0141184 A1 | 6/2013 | Tamaru et al. | |
| 2013/0237164 A1 | 9/2013 | Chien et al. | |
| 2013/0266085 A1 | 10/2013 | Sesia et al. | |
| 2014/0192923 A1 | 7/2014 | Matsuo et al. | |

FOREIGN PATENT DOCUMENTS

| | | |
|---|---|---|
| EP | 1533964 A2 | 5/2005 |
| KR | 2010 0104980 A | 9/2010 |
| WO | WO 2010-092076 A1 | 8/2010 |
| WO | 2013/018365 A1 | 2/2013 |

OTHER PUBLICATIONS

Written Opinion of the Int'l Searching Authority dated May 27, 2015 in connection with PCT/KR2015/002191; 5 pages.

Communication dated Oct. 9, 2017 in connection with European Patent Application No. 15 75 7819.

Communication dated Oct. 19, 2017 in connection with European Patent Application No. 15 77 2761.

* cited by examiner

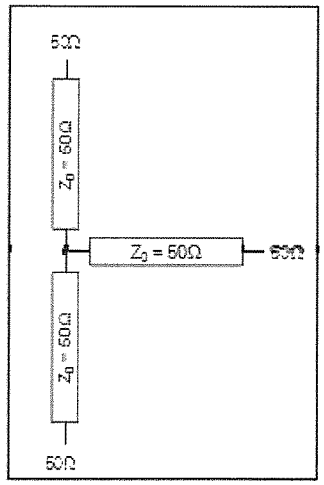 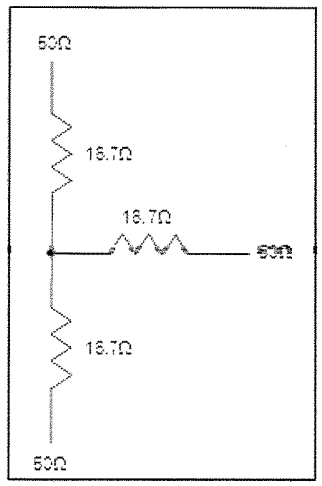 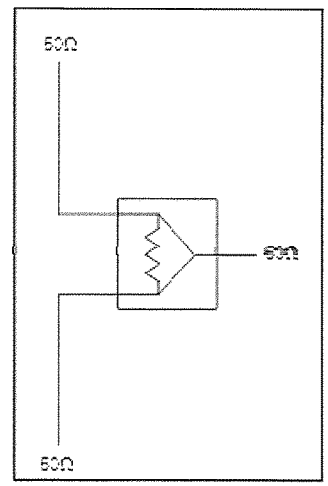
FIG. 5A  FIG. 5B  FIG. 5C
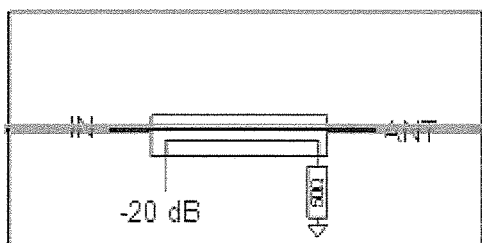 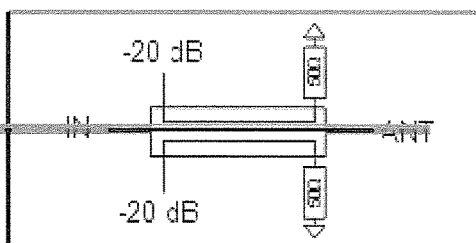
FIG. 6A  FIG. 6B

ANTENNA ARRAY SELF-CALIBRATION

CROSS-REFERENCE TO RELATED APPLICATION AND CLAIM OF PRIORITY

This application claims priority under 35 U.S.C. § 119(e) to U.S. Provisional Patent Application No. 61/948,767, filed on Mar. 6, 2014, and entitled "AN ENHANCED METHOD FOR ANTENNA ARRAY SELF-CALIBRATION." The above-identified provisional patent application is hereby incorporated by reference in its entirety.

TECHNICAL FIELD

This disclosure relates generally to transceiver calibration. More specifically, this disclosure relates to antenna array self-calibration.

BACKGROUND

In multi-antenna transmission and reception systems, multiple signals are transmitted by and received by different antenna paths. Due to several factors, including machinating tolerances, network conditions, and interference, signals transmitted by different antenna paths may experience different than expected phase shifts and/or time delays leading to decrease in transceiver performance.

Calibrating the antenna paths can reduce or eliminate these differences. Antenna arrays may be calibrated using external equipment before installation. However, those methods can only be used for offline calibration, which is suitable for passive antenna arrays and not active antenna arrays.

Antenna arrays may also be calibrated using additional circuitry included with the antenna array. However, including additional circuitry may introduce additional error in calculating parameters needed for calibration. This error may increase exponentially with the number of antennas and antenna paths included in the antenna array.

SUMMARY

This disclosure provides antenna array self-calibration.

In one exemplary embodiment, an apparatus for calibrating an antenna array is provided. The apparatus includes first and second couplers, a calibration transceiver, and a controller. The first coupler operably is connected to a first number of antennas. The second coupler is operably connected to a second number of antennas. The calibration transceiver is operably connected to the first and second couplers via a common path. The controller is configured to perform calibration on at least one or more transmit/receive paths for the second number of antennas based on at least one or more signals received from or transmitted to the first and second couplers via the common path by the calibration transceiver.

In another exemplary embodiment, an apparatus for calibrating an antenna array is provided. The apparatus includes a plurality of couplers, a plurality of T-junctions, and a controller. Each of the couplers is operably connected to an antenna in the antenna array. Each of the T-junctions operably connects couplers for a pair of adjacent antennas to a calibration transceiver via a common path. The controller is configured to perform calibration on the pair of adjacent antennas based on at least one or more signals received from or transmitted to the couplers via the common path by the calibration transceiver.

In yet another exemplary embodiment, an apparatus for calibrating an antenna array is provided. The apparatus includes a plurality of couplers, a plurality of T-junctions, and a controller. Each of the couplers is operably connected to a group of antennas in the antenna array. Each of the T-junctions operably connects couplers for a pair of adjacent antenna groups to a calibration transceiver via a common path. The controller is configured to perform calibration on the pair of adjacent antenna groups based on at least one or more signals received from or transmitted to the couplers via the common path by the calibration transceiver.

In still yet another exemplary embodiment, a method for calibrating an antenna array is provided. The method includes at least one of receiving or transmitting, by a calibration transceiver, one or more signals to or from a first coupler operably connected to a first number of antennas and a second coupler operably connected to a second number of antennas via a common path connecting the first coupler and the second coupler to a calibration circuit. Additionally, the method includes performing calibration on at least one or more transmit/receive paths for the second number of antennas based on the one or more signals at least one of received or transmitted via the common path.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. The phrase "number of antennas" means any number of antennas—from one antenna to any number greater than one, e.g., could include only one antenna or could include hundreds of antennas.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 5A to 5C illustrate example T-junctions according to this disclosure;

FIGS. 6A and 6B illustrate example couplers according to this disclosure;

DETAILED DESCRIPTION

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
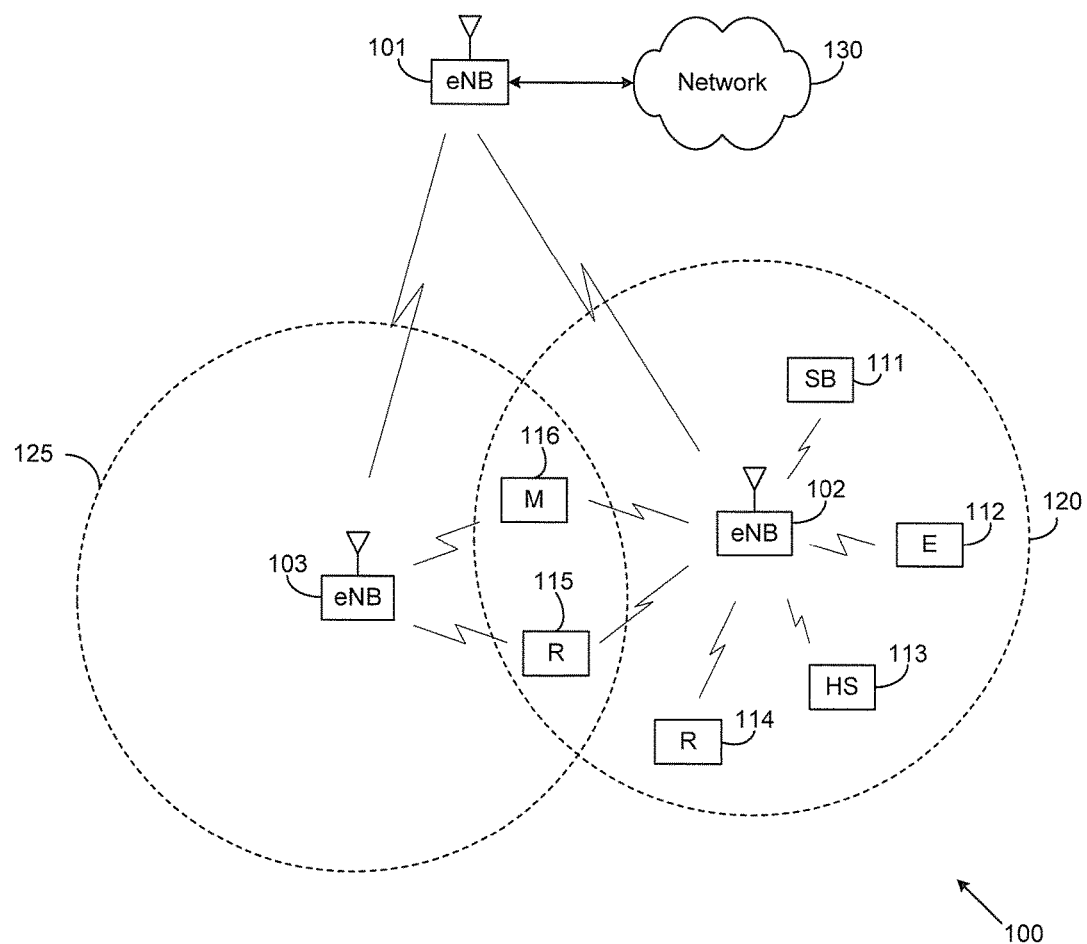
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the eNBs and/or UEs may include circuitry for performing antenna array self-calibration. Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2:
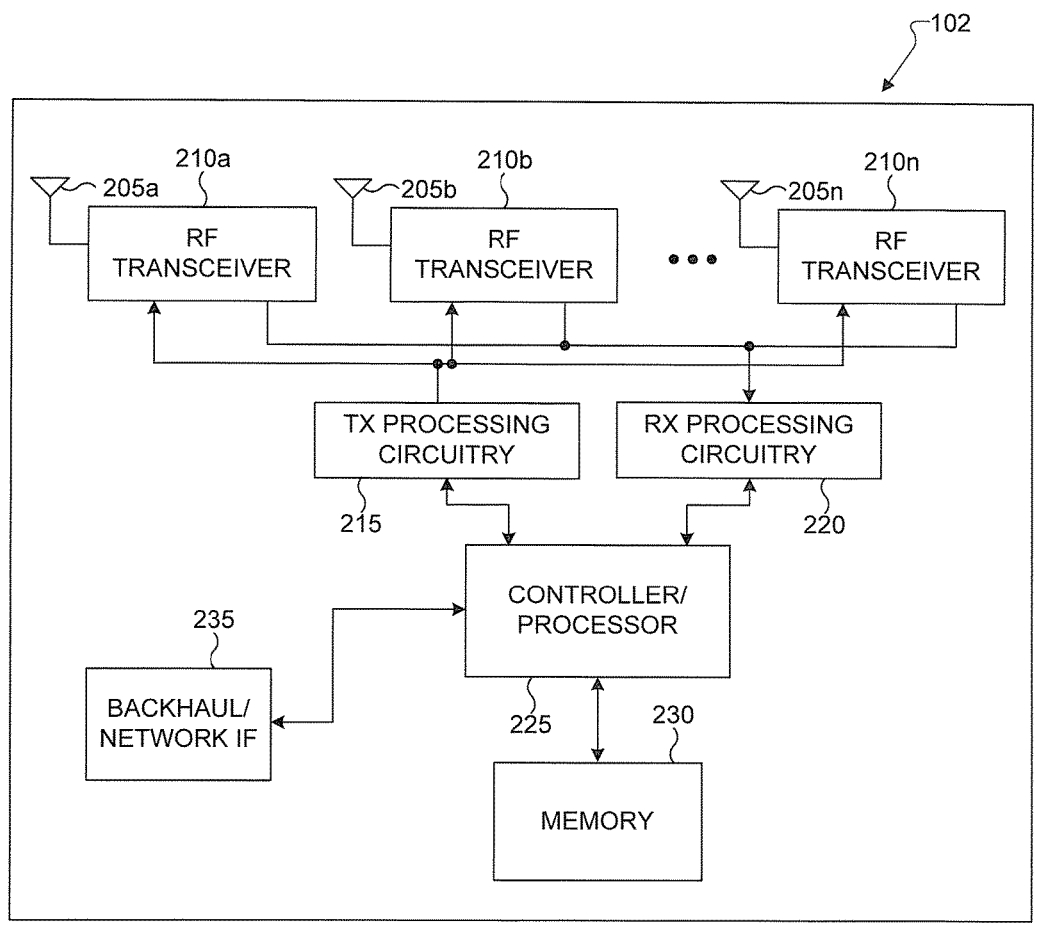
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the eNB 102 may include circuitry for performing antenna array self-calibration. Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
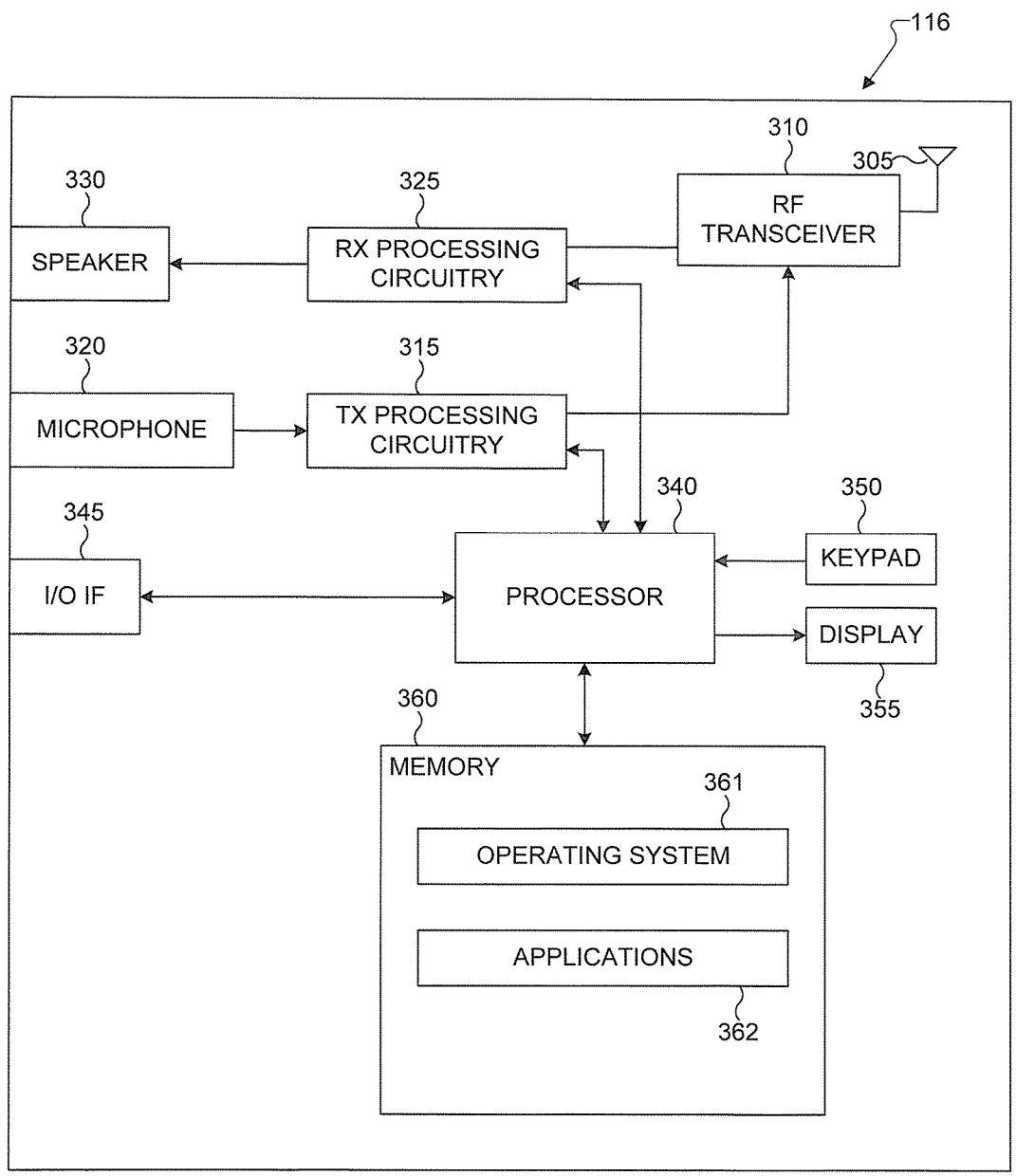
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, a keypad 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the keypad 350 and the display 355. The operator of the UE 116 can use the keypad 350 to enter data into the UE 116. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 may include circuitry for performing antenna array self-calibration. Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

In wireless communication, multiple-input and multiple-output (MIMO) is the use of multiple antennas at both the transmitter and receiver to improve communication performance, such as data throughput, and to mitigate against deep fading phenomena. MIMO is one of several forms of smart antenna technology. A smart antenna array (also known as adaptive array antennas) is an antenna array with smart signal processing algorithms used to extract information from received data in order to estimate the direction of arrival of the signals and to estimate the channel state information between the transmitter and receivers. This information is used to compute the beamforming weights that maximize the signal strength at the intended receivers and minimize the interference at the unintended ones.

In order to perform an accurate beamforming, all the transceivers including antenna paths should work together in a coherent manner. In other words, the signals transmitted at every antenna port should be synchronized in phase, time, and amplitude, and the received signals must be synchronized in phase, time, and amplitude at every Analog-to-Digital Converter (ADC) port. Since the circuitry components of the transceivers may differ due to manufacturing variations, loose tolerances, temperature, and aging, the coherency between transceivers is lost. To provide and restore coherency between all transceivers, embodiments of the present disclosure provide a calibration scheme.

Embodiments of the present disclosure provide a real-time and self-calibration scheme for smart antenna arrays. This scheme includes a calibration network, a data capturing mechanism, and an algorithm to compute the transceiver's calibration parameters based on the captured data. These parameters include the time ($\tau$) and the phase ($\phi$) of each signal transmitted and received. For a two antenna/transceiver example, calibration is achieved when: $\tau_{RX1}=\tau_{RX2}$; $\tau_{TX1}=\tau_{TX2}$; $\phi_{RX1}=\phi_{RX2}$; and $\phi_{TX1}=\phi_{TX2}$, where RX1 and RX2 indicate the receive path for the first and second antennas/transceivers, respectively, and TX1 and TX2 indicate the transmit path for the first and second antennas/transceivers, respectively.

To increase the equality of these parameters, embodiments of the present disclosure estimate these parameters through measurement. Embodiments of the present disclosure measure and estimate the parameters $\Delta\tau_{RX}=(\tau_{RX1}-\tau_{TX2})$, $\Delta\tau_{TX}=(\tau_{TX1}-\tau_{TX2})$, $\Delta\phi_{RX}=(\phi_{RX1}-\phi_{RX2})$, and $\Delta\phi_{TX}=(\phi_{TX1}-\phi_{TX2})$ to enable beamforming calibration of a plurality of antenna paths with reduced or minimum error.

Figure 4:
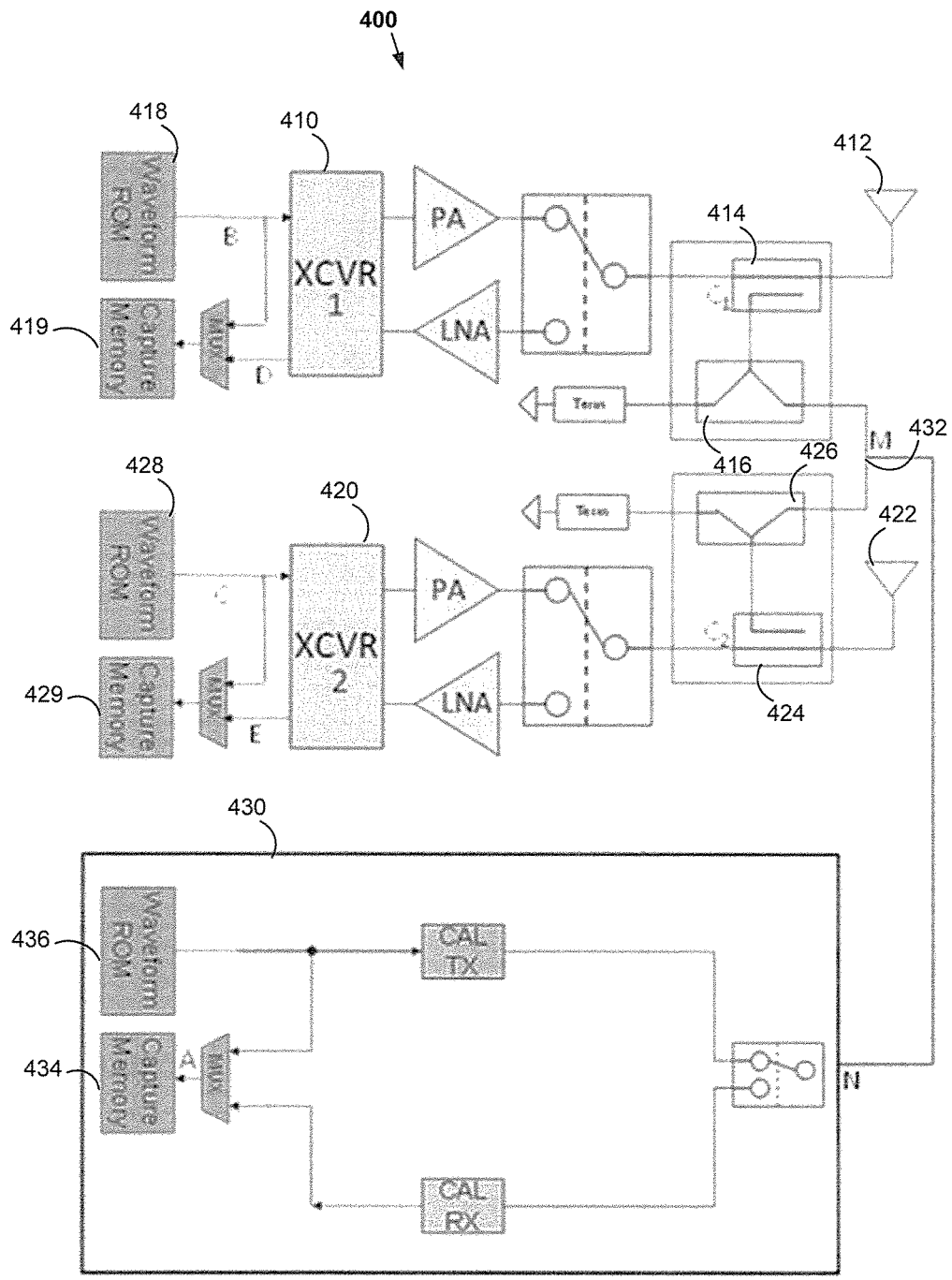
FIG. 4 illustrates an example two transceiver calibration system including two wireless communication transceivers and a calibration transceiver according to this disclosure.

FIG. 4 illustrates an example two transceiver calibration system 400 including two wireless communication transceivers 410 and 420 and a calibration transceiver 430 according to this disclosure. For example, the system 400 may be present in a base station, such as the eNB 102 in FIG. 2 or in a UE, such as the UE 116 in FIG. 3. This illustrative example is a simple illustration of the principals of the present disclosure implemented using only two transceivers. System 400, for example, a base station, such as eNB 102, includes transceivers 410 and 420 which transmit and receive signals via antennas 412 and 422, respectively. The system 400 also includes two couplers 414 and 424 which are coupled to the paths between the transceivers 410 and 420 and antennas 412 and 422, respectively. The two couplers 414 and 424 are connected together through two splitters 416 and 426. The two couplers 414 and 424 also may be directly connected (e.g., without the splitters 416 and 426). A T-connection or T-junction 432 between the couplers 414 and 424 at point M is used to connect to point N, which is the input/output of the calibration transceiver 430 (the calibration transceiver and associated calibration circuitry may be referred to as a common calibration circuit (CCC)). The distance between point N and point C1 and C2 (at the two couplers 414 and 424) is assumed known and may be designed to have an accurate fixed length.

A primary focus of the calibration procedure is to find the relative parameters, such as time delay, phase, and amplitude between two transceivers connected through their couplers 414 and 424. Another focus of the calibration procedure is to develop calibration architectures and procedures, with the use of a combination of different calibration circuits, to reduce the calibration error for two or more transceivers. In addition, the present disclosure introduces redundant circuitry to improve robustness of calibration against calibration circuit failure.

FIGS. 5A to 5C illustrate example T-junctions according to this disclosure. The T-junction 432 connects the two transceiver stages together by connecting each transceiver's coupler together to the common point M and also allows connection to the calibration transceiver 430 at point N.

These illustrative embodiments discuss the practical implementation of several variations of T-Junctions.

Referring to FIG. 5A, three quarter-wavelength (λ/4) 50Ω transmission lines are connected together to form a T-Junction. This configuration may be a simple way to make a 3-way RF connection but may have the disadvantage that the impedance at each 50Ω port is no longer matched since each port sees two 50Ω paths in parallel which combine to equal 25Ω, and a corresponding voltage standing wave ratio (VSWR) of 2:1, equivalently a 9.5 dB return loss. This configuration sets up reflections and standing waves that could create phase uncertainty in the measurements by the calibration transceiver 430.

Referring to FIG. 5B, a lossy combiner with equal resistors of value=Z0/3 are used to match the port impedances to 50Ω. The return loss at each port is practically perfect, since each port sees 16.7Ω+(16.7Ω+50Ω)∥(16.7Ω+50Ω)=50Ω. The drawback is that the resistors add a 3 dB loss to the 3 dB splitting loss for a combined 6 dB loss.

Referring to FIG. 5C, a Wilkinson splitter/combiner may be used to match the port impedances to 50Ω and also provide a 3 dB power split with very low insertion loss, typically <0.2 dB. The Wilkinson splitter/combiner uses two quarter-wavelength (λ/2)) 70.7Ω transmission lines and a 100Ω isolation resistor to achieve this performance. The (λ/4) lines are transformers that rotate the impedance on the Smith Chart by 90° such that a 70.7Ω line appears as 100Ω. The 100Ω line in parallel with the resistor 100Ω becomes 50Ω, the ideal matched impedance. The drawback is the λ/4 lines are only matched at a single specific frequency, and as the bandwidth becomes wider, the impedance matching becomes worse. FIGS. 5A-5C illustrate example T-junction variations. The values associated with the different T-junction variations are for the purpose of illustrating an example and may be suitably modified and/or scaled based on design objectives and parameters.

FIGS. 6A and 6B illustrate example couplers according to this disclosure. The couplers 414 and 424 are used in transmit mode calibration as part of a measurement circuit to sample a portion of the signals to be transmitted by the antennas 412 and 422 and provide the sampled signals to the calibration transceiver 430. In receiver mode calibration, the calibration transceiver 430 supplies a signal to the couplers 414 and 424, which the couplers 414 and 424 couple into the receive paths for the transceivers 410 and 420. The transceivers 410 and 420 ultimately receive the injected signal, which is used for measurement as will be discussed in greater detail below.

FIG. 6A illustrates a four port coupler, and FIG. 6B illustrates a six port coupler. In these illustrative examples, the coupling value is selected as ≤−20 dB to minimize or reduce the amount of signal going to the calibration transceiver 430 and maximize or increase the signal going to the antenna. For example, a 3 dB coupler would split away about half the power that would normally go to the antenna (e.g., −3 dB power loss), a 10 dB coupler would split away about 1/10 the power (e.g., −0.46 dB power loss), and a 20 dB coupler splits away about 1/100 the power (e.g., −0.043 dB power loss). As a result, in these examples, the coupler only degrades the antenna output power by about −0.043 dB when using a 20 dB coupler. Typical couplers may include four ports, with the unused port-4 terminated into 50Ω. Various embodiments of the present disclosure also use a 6-port coupler, which can be implemented as illustrated in FIG. 6B. FIGS. 6A and 6B illustrate example couplers. The values associated with the couplers are for the purpose of illustrating an example and may be suitably modified and/or scaled based on design objectives and parameters.

For the two transceiver calibration example discussed above, four measurements are used in order to compute the relative parameters between the transmitters of transceivers 410 and 420 and the relative parameters between the receivers of transceivers 410 and 420. The calibration procedures include capturing and measuring transmitted and received signals and then using information estimated from the measured signals to calculate the calibration parameters.

For the first measurement, the transceiver 410 transmits a signal from waveform memory 418 at point B while the calibration transceiver 430 receives and captures the transmitted signal in memory 434 at point A. For the second measurement, the transceiver 420 transmits a signal from waveform memory 428 at point C while the calibration transceiver 430 receives and captures transmitted signals in memory 434 at point A. A controller or processor, such as, for example, the controller/processor 225 in FIG. 2, the processor 340 in FIG. 3, or the controller 1405 in FIG. 14, executing correlation techniques and phase difference detection algorithms, computes the time delay and carrier phase difference of both signals between points B and A and between points C and A. In equation form:

$$\tau_{BA} = \tau_{BC_1} + \tau_{C_1M} + \tau_{MN} + \tau_{NA} \quad \text{Equation 1}$$

$$\tau_{CA} = \tau_{CC_2} + \tau_{C_2M} + \tau_{MN} + \tau_{NA} \quad \text{Equation 2}$$

where $C_1$ and $C_2$ are the point of coupling of the couplers 414 and 424. Taking the difference between the two equations and isolating the time for the respective transmit paths $\tau_{BC_1} - \tau_{CC_2}$ results in Equation 3:

$$\tau_{BC_1} - \tau_{CC_2} = (\tau_{BA} - \tau_{CA}) - (\tau_{C_1M} - \tau_{C_2M}) \quad \text{Equation 3.}$$

The term $(\tau_{BA} - \tau_{CA})$ is known by the two measurements, i.e., measurement 1 result is $\tau_{BA}$, and measurement 2 result is $\tau_{CA}$. The term $(\tau_{C_1M} - \tau_{C_2M})$ is also known, since the position of point M is chosen by design to be the midpoint between points C1 and C2. If not at the exact midpoint, the value may be calculated or estimated based on the respective lengths of the paths between M and C1/C2. As a result, the relative time delay between the transmit paths for the antennas 412 and 422 is computed as $\Delta\tau_{TX} = (\tau_{BC_1} - \tau_{CC_2})$. To calibrate the time delay between the transmit paths to ideally be zero, a time delay can be added to either transceiver for proper compensation. This time delay (not shown) may be implemented in the baseband TX path or could be an analog/RF delay.

The same two captured data sets can be used to compute carrier phase difference between the transmit paths for the antennas 412 and 422. Using the same analysis for time delay results in the following equations for phase:

$$\varnothing_{BA} = \varnothing_{BC_1} + \varnothing_{C_1M} + \varnothing_{MN} + \varnothing_{NA} \quad \text{Equation 4}$$

$$\varnothing_{CA} = \varnothing_{CC_2} + \varnothing_{C_2M} + \varnothing_{MN} + \varnothing_{NA} \quad \text{Equation 5}$$

Taking the difference between the two equations and isolating phase for the respective transmit paths $\varnothing_{BC_1} - \varnothing_{CC_2}$ results in Equation 6:

$$\varnothing_{BC_1} - \varnothing_{CC_2} = (\varnothing_{BA} - \varnothing_{CA}) - (\varnothing_{C_1M} - \varnothing_{C_2M}) \quad \text{Equation 6.}$$

The term $(\varnothing_{BA} - \varnothing_{CA})$ is known by the two measurements, i.e., measurement 1 result is $\varnothing_{BA}$, and measurement 2 result is $\varnothing_{CA}$. The term $(\varnothing_{C_1M} - \varnothing_{C_2M})$ is also known, since the position of point M is purposely designed to be the midpoint between points C1 and C2. If not at the exact midpoint, the value may be calculated or estimated based on the respective lengths of the paths between M and C1/C2. As a result, the relative phased difference between the transmit paths for the antennas 412 and 422 is computed as $\Delta\phi_{TX}=(\emptyset_{BC_1}-\emptyset_{CC_2})$. To calibrate the phase delay between the transmit paths to ideally be zero, a phase adjustment can be added to either transceiver for proper compensation. This phase delay (not shown) may be implemented in the baseband TX path or could be an analog/RF delay.

The above calibration procedure for the transmitter antenna path can also be used to compute the relative time delay and phase difference between two receivers. However, for receiver calibration, the calibration transceiver 430 does the transmitting. For example, the calibration transceiver 430 may transmit a signal from waveform memory 436, which is coupled into the respective receive paths via couplers 414 and 424 for reception by transceivers 410 and 420 at points D and E, respectively, and capture by memories 419 and 429, respectively. Circuitry for the calibration transceiver 430 may measure the received and captured signals as discussed above.

Figure 14:
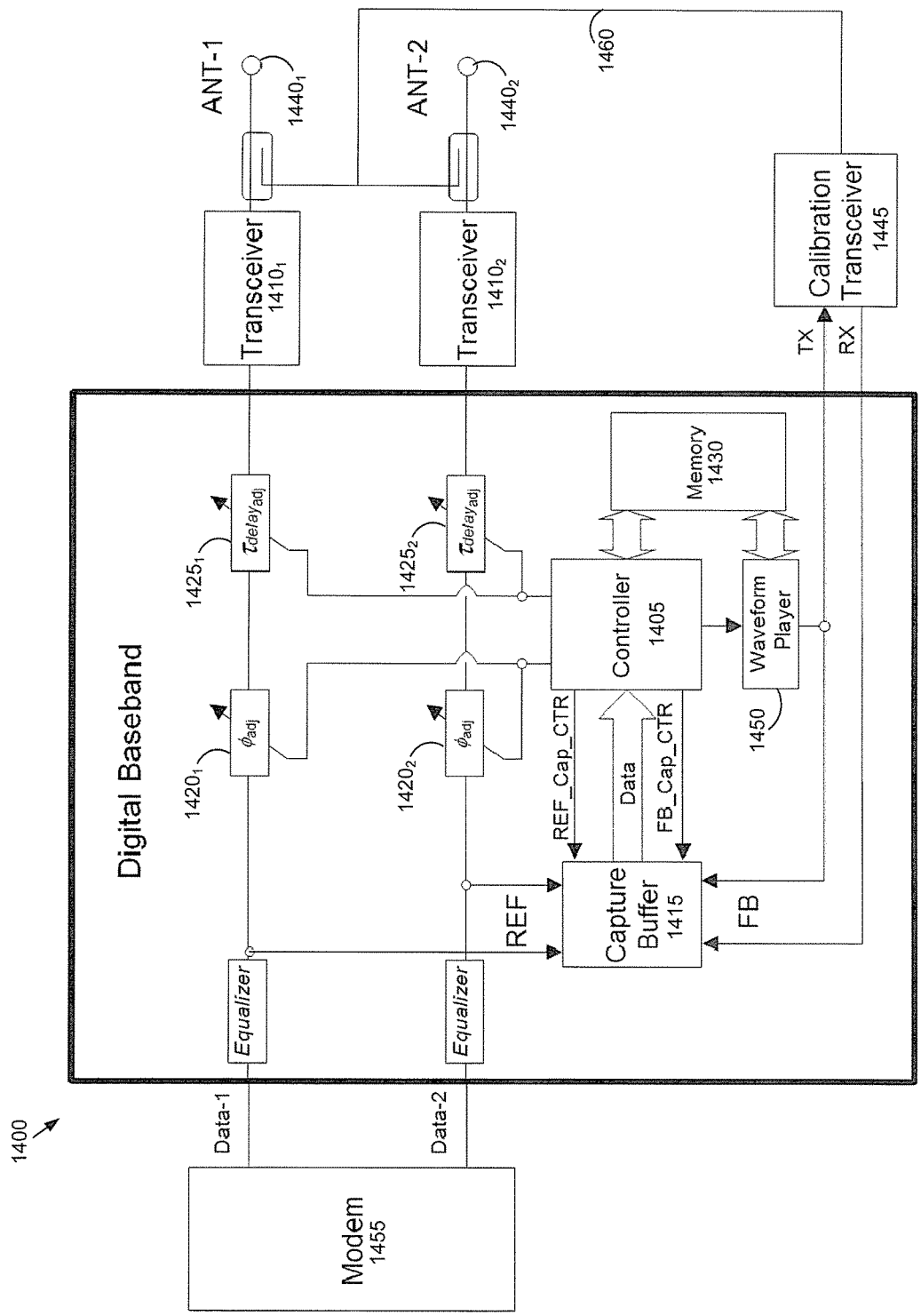
FIG. 14 illustrates an example transceiver calibration system according to this disclosure.

After performing the two measurements, a controller or processor, such as, for example, the controller/processor 225 in FIG. 2, the processor 340 in FIG. 3, or the controller 1405 in FIG. 14, executing DSP algorithms performs the same or similar analysis and calculation to obtain the time difference $\Delta\tau_{RX}=(\tau_{DC_1}-\tau_{EC_2})$ and the phase delay $\Delta\phi_{RX}=(\emptyset_{DC_1}-\emptyset_{EC_2})$ between the receive paths for the antennas 412 and 422. To calibrate the time difference and phase delay between the receive paths to ideally be zero, a time delay and a phase adjustment can be added to either transceiver for proper compensation. This time delay and a phase adjustment (not shown) may be implemented in the baseband TX path or could be an analog/RF delay.

The above two transceiver examples can be applied to multiple transceivers (more than two transmitters and receivers) for a MIMO or beamforming system. Multiple measurements can be performed between connected transceivers to establish the full calibration needed for the system to achieve time, phase, and amplitude alignment between each transmit antenna port, and achieve time, phase, and amplitude alignment between each receiver at the Analog-to-Digital Converter (ADC) port.

Figure 7:
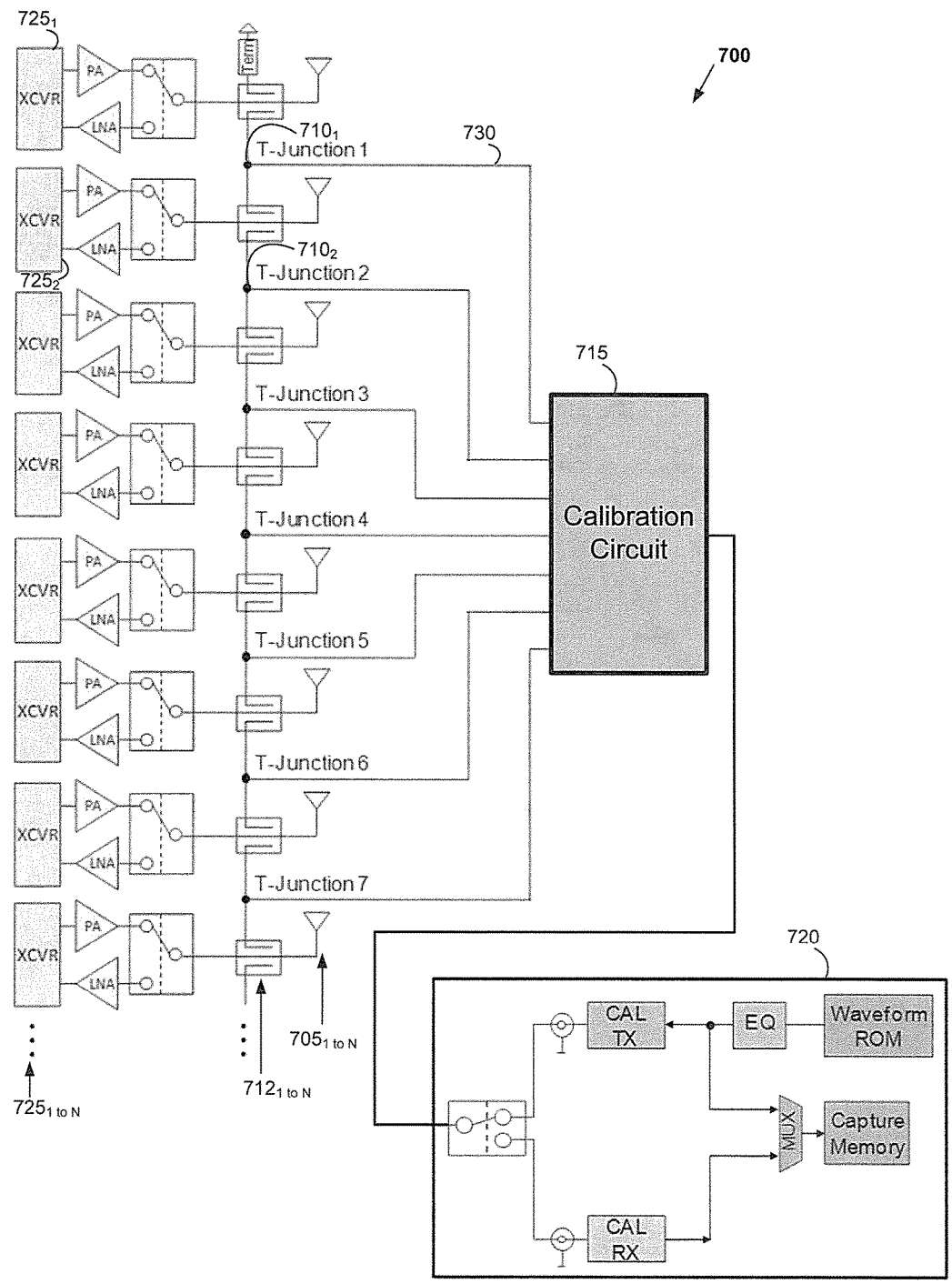
FIG. 7 illustrates an example multiple transceiver calibration system according to this disclosure.

FIG. 7 illustrates an example multiple transceiver calibration system 700 according to this disclosure. For example, the multiple transceiver calibration system 700 may be present in a base station, such as the eNB 102 in FIG. 2 or in a UE, such as the UE 116 in FIG. 3. As illustrated, for a wireless communication device with N antenna ports/antenna paths 705, the multiple transceiver calibration system 700 includes N−1 T-junctions 710, N couplers 712, and a calibration circuit 715 at the input to the calibration transceiver 720. The calibration circuit 715 may include an N−1 splitter/combiner or N−1 switch. In this example, each pair of adjacent antennas 705 share a common path between the T-junction connecting the couplers for the respective antennas in the pair and the calibration circuit 715. This is important, because each of the N−1 splitter/combiner paths or N−1 switch paths differs from each other in phase, amplitude, and delay due to manufacturing variations. These circuit tolerance errors would normally result in calibration errors of the same magnitude being implemented in the antenna paths 705. However, using relative calibration for antenna paths 705 that share a common path as described herein reduces, minimizes, and/or eliminates the impact of such differences on calibration error.

For example, T-Junction 1 710₁ is used to calibrate the antenna paths 705₁ and 705₂ of transceiver 725₁ and transceiver 725₂ and uses the common path 730 through the calibration circuit 715 and through the calibration transceiver 720. Since only one path 730 is used in the added calibration components of the system 700 to calibrate the two transceiver 725₁ and 725₂, there is no dependence on the tolerance error introduced into the system 700 from added calibration components (730, 715 and 720) in calibration of the transceivers 725₁ and 725₂ relative to each other. In other words, any tolerance error introduced into the system 700 from added calibration components is the same or negligible (e.g., assuming that the path between the respective couplers 712₁ and 712₂ and the T-junction 710₁ is the same or a known and accounted for length) for calibration of the transceivers 725₁ and 725₂. This is a key advantage and a breakthrough in eliminating or reducing calibration errors due to circuit tolerances.

While the discussion above references N antennas and transceivers with N−1 T-junctions, in various embodiments, the $1^{st}$ and $N^{th}$ antennas/transceivers may also be joined via an $N^{th}$ T-junction, essentially forming a system including a loop of connected antenna/transceiver pairs and a total of N T-junctions and paths through the calibration circuit 715 to/from the calibration transceiver 720.

Figure 8:
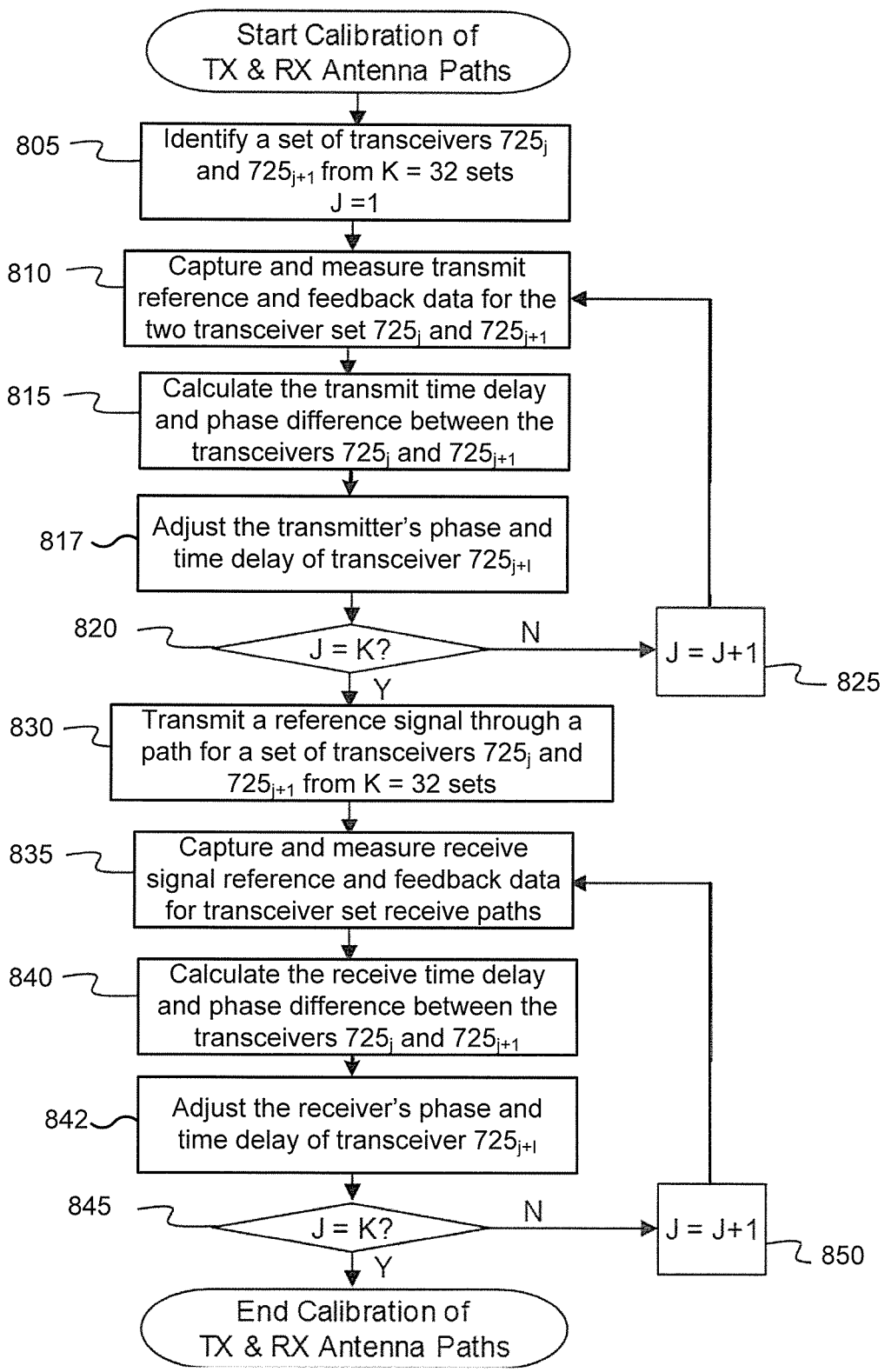
FIG. 8 illustrates an example process for calibration of a 32 transceiver antenna path system according to this disclosure.

FIG. 8 illustrates an example process for calibration of a 32 transceiver antenna path system according to this disclosure. The process illustrated in FIG. 8 may be performed by the calibration transceiver 720 in FIG. 7 and/or by control circuitry associated with the calibration transceiver 720, such as the processor/controller 225 in FIG. 2, the processor 340 in FIG. 3, or the controller 1405 in FIG. 14, collectively or individually referred to as "the system."

The process begins with the system identifying a set of transceivers 725ⱼ and 725ⱼ₊₁ from K=32 sets present in the wireless communication device to be calibrated, which at the start of the process is J=1 (step 805). The system then captures and measures transmit reference and feedback data for the two transceiver set 725ⱼ and 725ⱼ₊₁ (step 810). The system then calculates the transmit time delay and phase difference between the transceivers 725ⱼ and 725ⱼ₊₁ (step 815) and calibrates the path between the transceivers 725ⱼ and 725ⱼ₊₁ by adjusting the transmitter's phase and time delay of transceiver 725ⱼ₊₁ (step 817). The system determines whether the currently calibrated set of transceivers is the last set i.e., J=K (step 820). If not, the system proceeds to the next transceiver set by increasing J by 1 (step 825) to repeat the transmit path calibration process recursively by measuring and calibrating the current channel or antenna path relative to a previously calibrated channel or antenna path.

For receive path calibration, the system begins with identifying a set of transceivers 725ⱼ and 725ⱼ₊₁ from K=32 sets present in the wireless communication device to be calibrated, which at the start of the receive path calibration process is J=1, and the calibration transceiver transmits a reference signal through the path for the two transceiver set 725ⱼ and 725ⱼ₊₁ (step 830). The system then captures and measures receive signal reference and feedback data for receive paths for the two transceiver set 725ⱼ and 725ⱼ₊₁ (step 835). The system then calculates the receive time delay and phase difference between the transceivers 725ⱼ and 725ⱼ₊₁ (step 840) and calibrates the path between the transceivers 725ⱼ and 725ⱼ₊₁ by adjusting the receiver's phase and time delay of transceiver 725ⱼ₊ (step 842). The system determines whether the currently calibrated set of transceivers is the last set i.e., J=K (step 845). If not, the system proceeds to the next transceiver set by increasing J by 1 (step 850) to repeat the receive path calibration process recursively by measuring and calibrating the current channel or antenna path relative to a previously calibrated channel or antenna path.

The process may occur once to calibrate the wireless communication device or may be repeated periodically or on demand to increase or improve the calibration of the wireless communication device. While the TX calibration process is depicted as occurring before the RX calibration process, the respective processes may be performed in any order or simultaneously with RX and TX paths for the current channel J being calibrated before proceeding with RX and TX calibration of channel J+1.

Figure 9B:
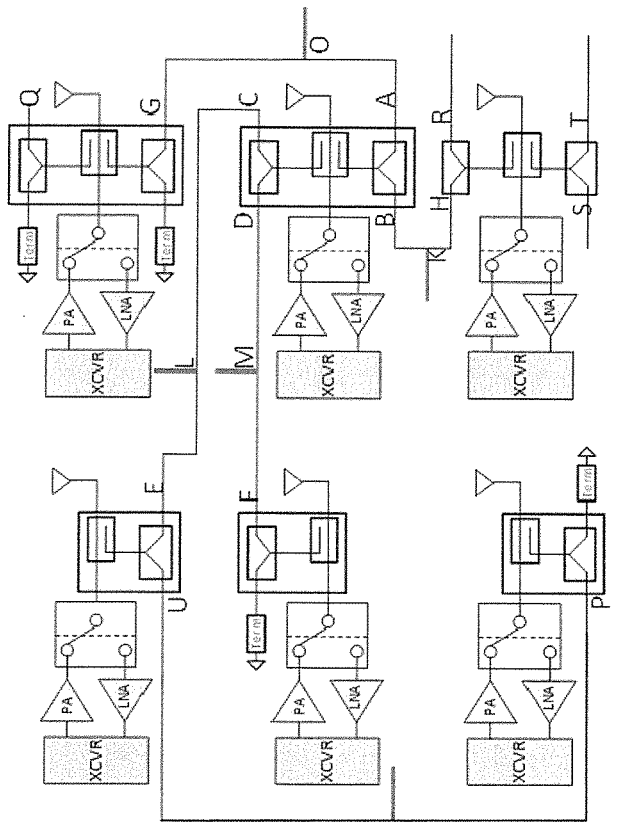
FIGS. 9A to 9C illustrate an example of a system for calibrating pairs of antennas in an antenna array according to this disclosure.
Figure 9A:
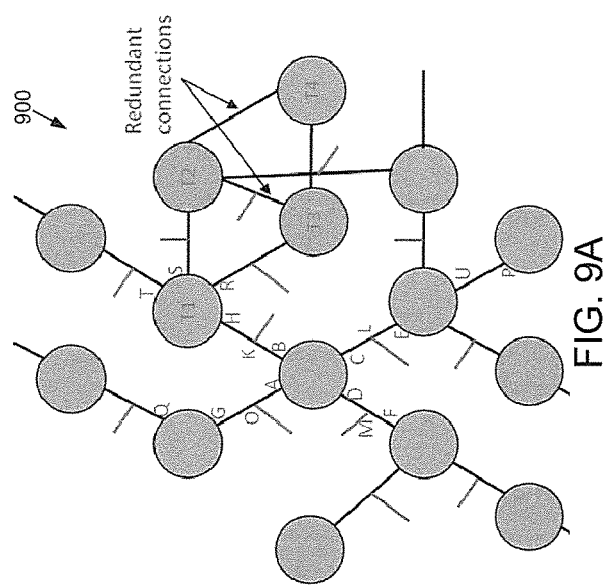
Figure 9C:
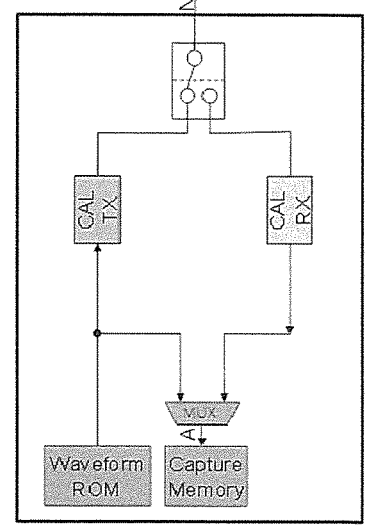

FIGS. 9A to 9C illustrate an example of a system for calibrating pairs of antennas in an antenna array according to this disclosure. In this illustrative example, antenna array 900 in FIG. 9A includes an array of antennas/transceivers represented as circles with connectors representing an antenna/transceiver connected to another antenna/transceiver, for example by a T-junction as illustrated in FIG. 7. The lines extending from the antenna/transceiver connections represent the common path shared between adjoining pairs of antennas/transceivers and the calibration transceiver and the letters depict the different nodes corresponding to the multiple transceiver block diagram shown in FIG. 9B, and the nodes that enter the calibration transceiver in FIG. 9C.

The network of connections between antennas/transceivers in the array for calibration may include redundant connections between antennas/transceivers. The redundant connections are extra paths added using splitters (FIG. 9B) between transceivers which may be beneficial for the below-discussed reasons. Because the calibration scheme used calculation of relative parameters between pairs of transceivers, a failure of a transceiver to operate properly can lead to an inability to calculate the relative parameters associated with the failed transceiver. For example, in order to calculate relative parameters between transceivers/antennas T1 and T4, the system may compute the relative parameters between T1 and T3 in addition to the parameters between T3 and T4. If transceiver T3 fails, this type computation may not be possible. However, with redundant connections, the system may use another path through the transceiver T2. The system can compute the relative parameters between T1 and T4 by first computing the relative parameters between T1 and T2 and then computing the relative parameters between T2 and T4. Additionally, having more connections between transceivers increases the number of paths. As a result, more measurements can be done which leads to a better estimation of the relative parameters between transceivers. For example, relative parameters can be computed between T1 and T4 using the path T1-T2-T4 and T1-T3-T4. Averaging the relative parameters from the two measurements can reduce the error.

Figure 10:
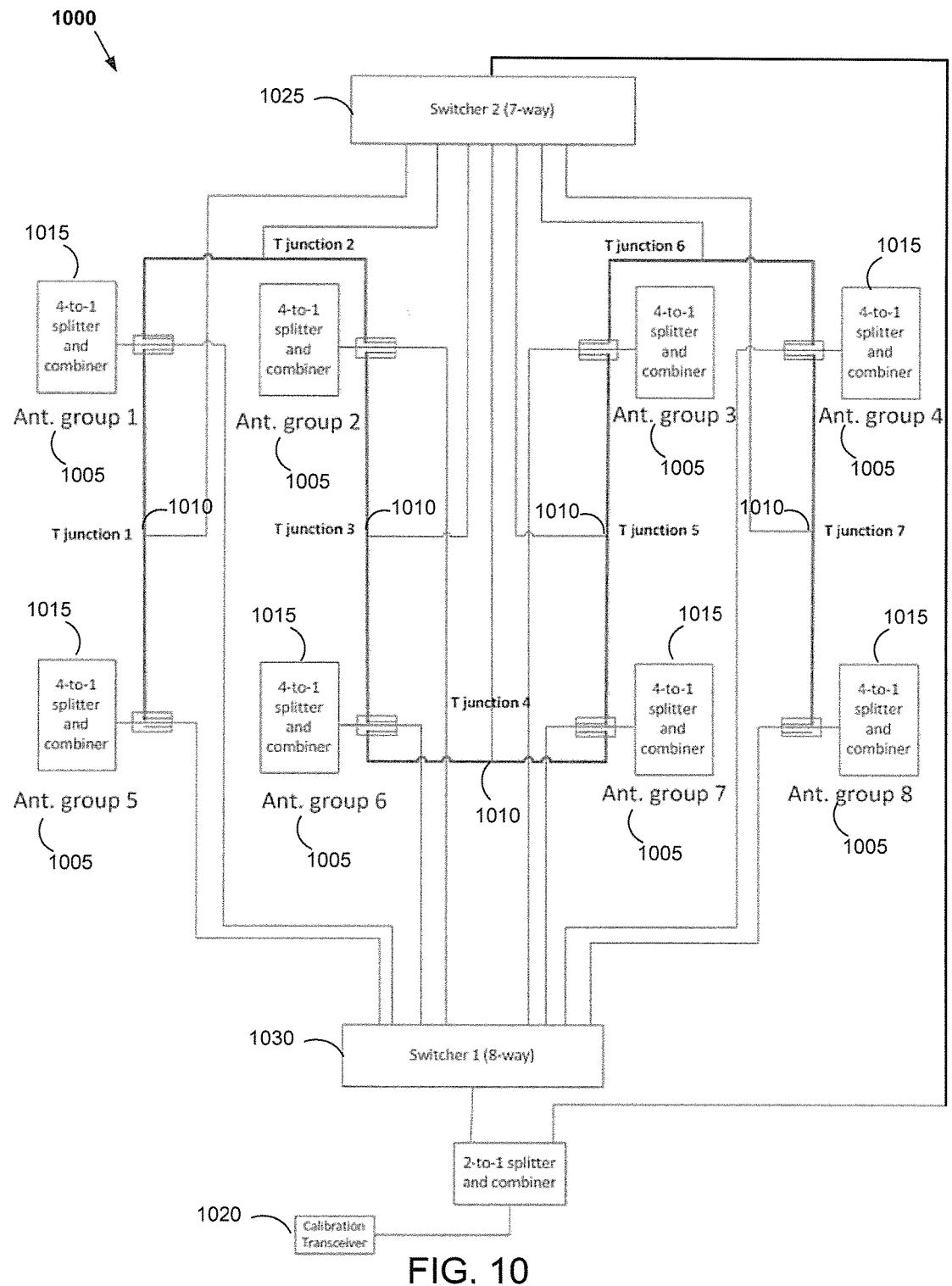
FIG. 10 illustrates an example multiple transceiver calibration system for calibrating pairs of antenna groups in an antenna array according to this disclosure.

FIG. 10 illustrates an example multiple transceiver calibration system 1000 for calibrating pairs of antenna groups in an antenna array according to this disclosure. For example, the multiple transceiver calibration system 1000 may be present in a base station, such as the eNB 102 in FIG. 2 or in a UE, such as the UE 116 in FIG. 3. In this illustrative embodiment, the system 1000 provides calibration for pairs of antenna/transceiver groups 1005 as opposed to single antenna/transceiver pairs.

As illustrated, a combination of T-junctions 1010 and combiner/splitters 1015 is used for calibration. On one hand, using a combiner/splitter in antenna calibration can simplify the topology of calibration relative to the single antenna/transceiver pairs method as described above. However, the accuracy of the combiner and splitter used in calibration may be limited by branches to be calibrated. For example, a 4-to-1 combiner/splitter can be manufactured with about 1-3 degree phase accuracy between splitter paths, while an 8-to-1 combiner/splitter can achieve about 3-5 degree phase accuracy. It also may be challenging to cascade multiple combiners/splitters with a small number of branches, as the error of each stage can propagate (e.g., error prorogation). On the other hand, the single antenna/transceiver pairs method discussed above can produce accurate pair-wise phase accuracy. However, an advantage of using calibration for pairs of antenna/transceiver groups is reduced usage of two-way couplers and reduced number of T-junctions, which results in a reduction in the number of phased matched transmission lines that are routed back to the calibration transceiver 1020. For example, with 32 antennas using single pairs of antennas 31 or 32 T-junctions and matched common calibration paths are used versus 7 or 8 using pairs of groups of four antennas.

In this illustrative embodiment, the system 1000 calibrates the antennas based on a combiner/splitter 1015 connected to each of the groups 1005, and using the T-junctions 1010 to measure and then compensate error induced by the cascading multiple combiner/splitters 1015. For example, the antennas are divided into multiple groups, where within one group the antennas are connected by a combiner/splitter 1015 with high accuracy. Then, different antenna groups are cascaded into a second-stage switcher 1025 (e.g., one or more RF switches) which connects to the calibration transceiver 1020. Each of the branches in the second-stage switcher 1025 is connected by a T-junction 1010. As a result, the phase difference of the branches can be found as discussed above. Then, the phase error induced by the second stage 1025 can be compensated. While FIG. 10 illustrates an example multiple transceiver calibration system for calibrating pairs of antenna groups in a 32 antenna array, the calibration scheme discussed above can be suitably scaled for any different number of antenna array.

Figure 11:
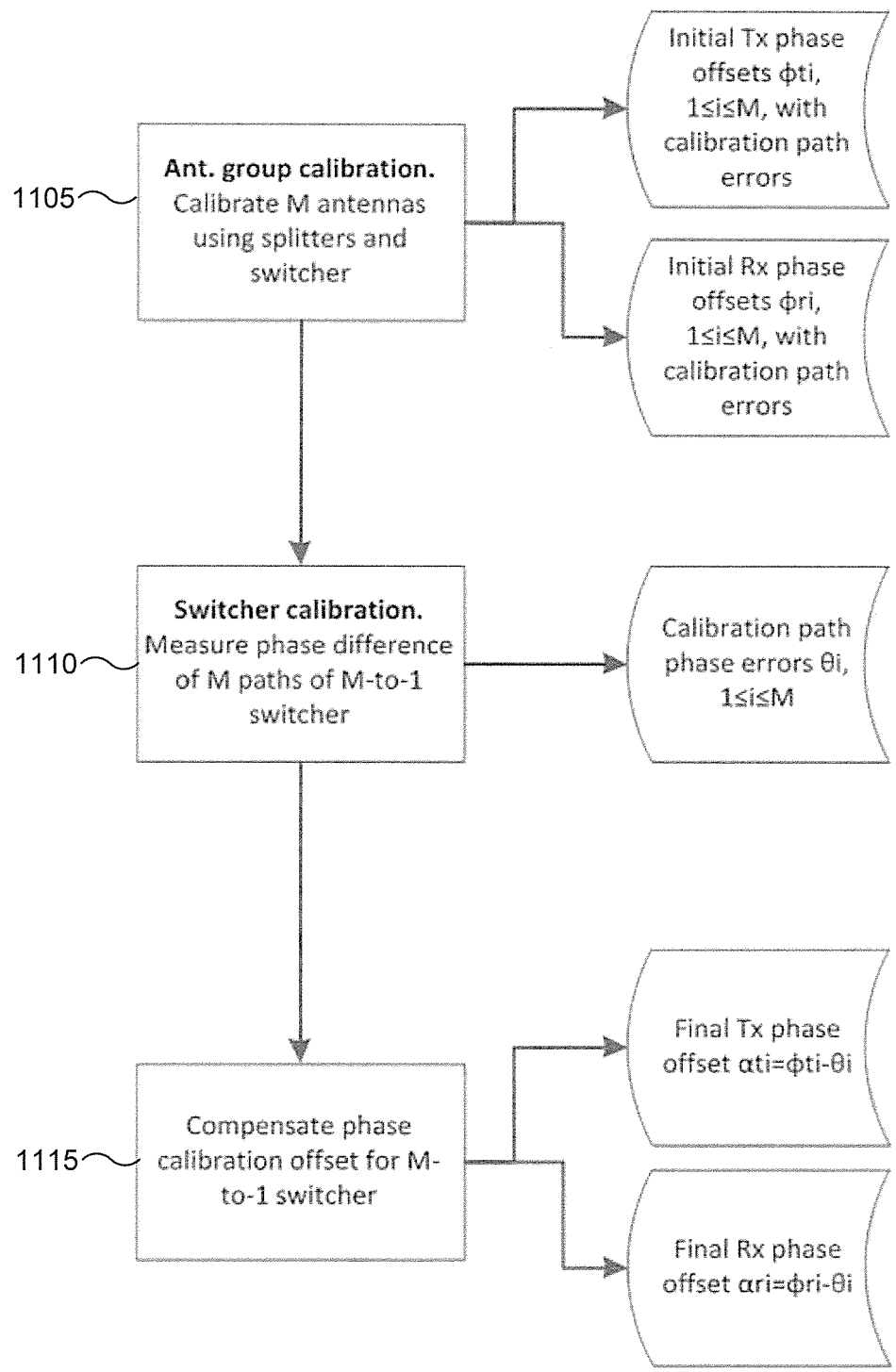
FIG. 11 illustrates an example process for calibration of a multiple transceiver calibration system including groups of antennas according to this disclosure.

FIG. 11 illustrates a process for calibration of a multiple transceiver calibration system including groups of antennas according to this disclosure. The process illustrated in FIG. 11 may be performed by the calibration transceiver 1020 in FIG. 10 and/or by control circuitry associated with the calibration transceiver 1020, such as the processor/controller 225 in FIG. 2, the processor 340 in FIG. 3, or the controller 1405 in FIG. 14, collectively or individually referred to as "the system."

The process begins with the system preforming antenna group calibration (step 1105), where individual antennas in the groups are calibrated using the splitter/combiners 1015 and the switcher 1030. In step 1105, the system calculates initial TX and RX phase offsets for the antennas, as will be discussed in greater detail below with regard to FIG. 12. In these embodiments, the initial TX/RX phase offsets for antenna i are denoted as $\phi_{ti}$ and $\phi_{ri}$, respectively. In the 32 antenna example of FIG. 10, M is the number of antennas and $1 \le i \le 32$ in this example.

The system performs switcher group calibration (step 1110), where the antennas in the groups are calibrated using the T-junctions 1010 and the switcher 1025. In step 1110, the system calculates calibration path phase errors, as will be discussed in greater detail below with regard to FIG. 13. The system then compensates for the final calculated TX and RX phase offset for the switcher 1025 (step 1115).

Figure 12:
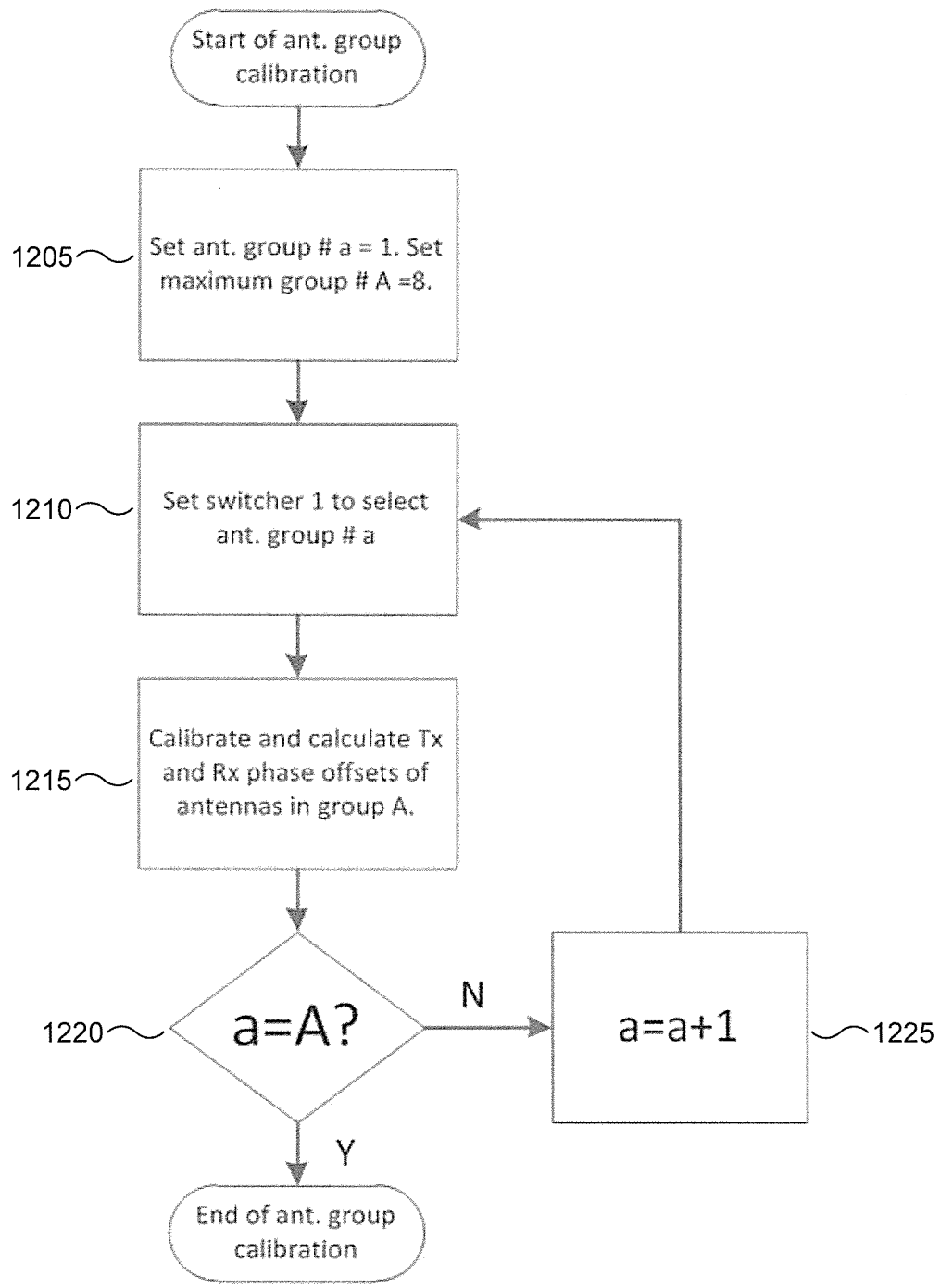
FIG. 12 illustrates an example process for calibration of groups of antennas according to this disclosure.

FIG. 12 illustrates a process for calibration of groups of antennas according to this disclosure. The process includes details of antenna group calibration from step 1105 of FIG. 11 discussed above. The process illustrated in FIG. 12 may be performed by the calibration transceiver 1020 in FIG. 10 and/or by control circuitry associated with the calibration transceiver 1020, such as the processor/controller 225 in FIG. 2, the processor 340 in FIG. 3, or the controller 1405 in FIG. 14, collectively or individually referred to as "the system."

The process begins with the system setting an antenna group to calibrate 'a' out of the set of antenna groups 'A' in the system (step 1205), 8 groups in the example in FIG. 10. Then the system sets the switcher (e.g., switcher 1030) to connect to antenna group 'a' (step 1210). The system then calibrates the antennas in the antenna group 'a' using a splitter and switcher (step 1215). For example, the system calibrates each antenna path one at a time using reference and feedback data captures in order to determine phase and delay differences between paths, and adjusts time delay and phase differences to the baseband and/or RF paths to calibrate each path to have equal or close to equal phase and time delay. The process then repeats the calibration procedure for each antenna group (step 1225) until all antenna groups have been calibrated (step 1220). As a result, the initial TX and RX phases offsets of all the antennas can be measured.

Figure 13:
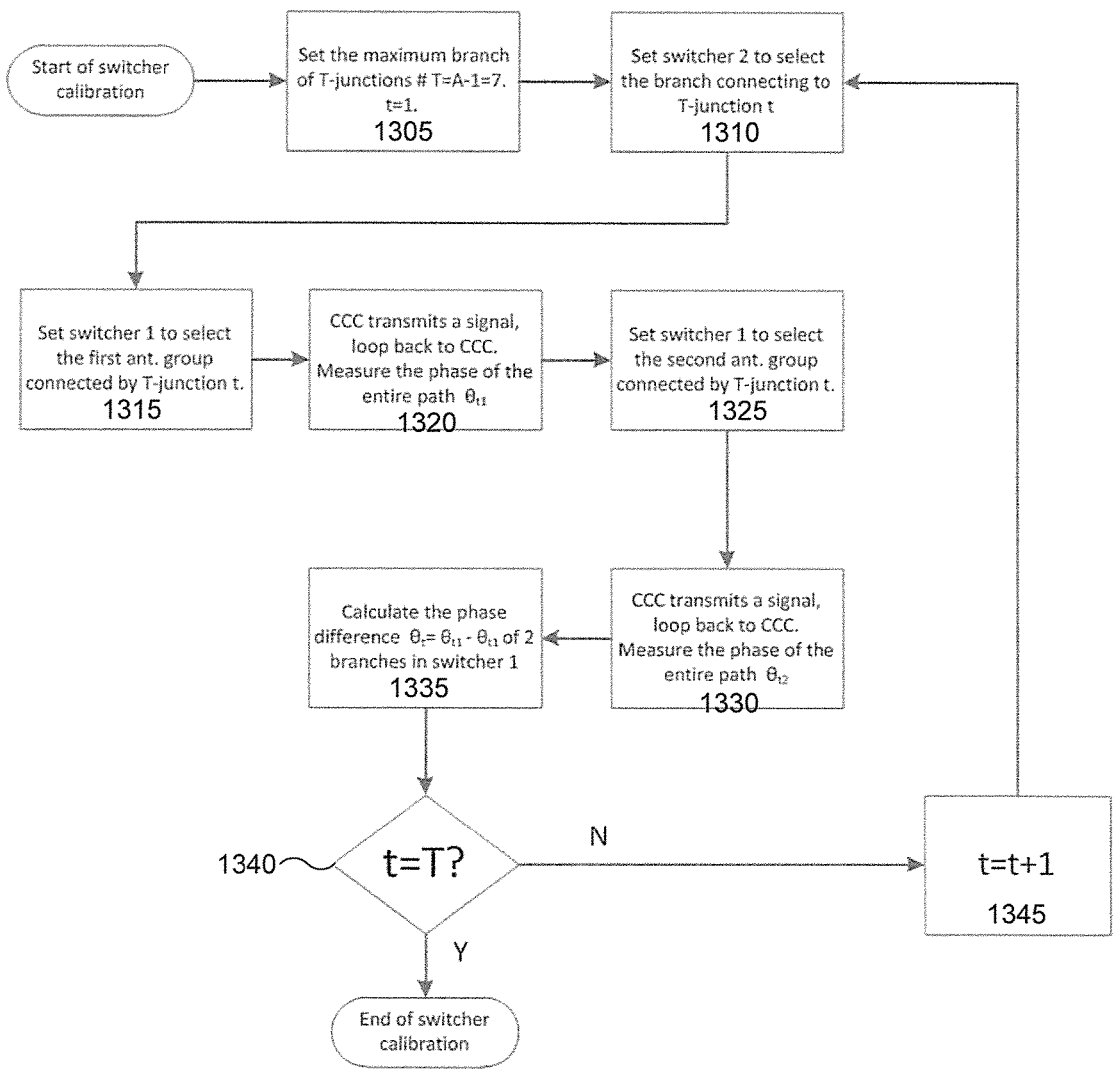
FIG. 13 illustrates an example process for calibration of switchers in a multiple transceiver calibration system according to this disclosure.

FIG. 13 illustrates a process for calibration of switchers in a multiple transceiver calibration system according to this disclosure. The process illustrated in FIG. 13 may be performed by the calibration transceiver 1020 in FIG. 10 and/or by control circuitry associated with the calibration transceiver 1020, such as the processor/controller 225 in FIG. 2, the processor 340 in FIG. 3, or the controller 1405 in FIG. 14, collectively or individually referred to as "the system."

The process begins with the system selecting and setting the current pair of antenna groups to be calibrated based on adjoining T-junction t (step 1305) by the switcher 1025 connecting to the path connecting to T-junction t (step 1310), where 1≤t≤7 in the example illustrated in FIG. 10. The system then sets the switcher 1030 to select the first antenna group connected to T-junction t (step 1315). The calibration transceiver transmits a sounding signal through the connected T-junction that, as discussed above, loops back to the calibration transceiver and is used to measure the phase difference of the loop back signal and the transmitted signal (step 1320). This phase difference is denoted as $\theta_{t1}$.

The system then sets the switcher 1030 to select the other antenna group of the pair of groups connected to the T-junction t (step 1325). Similarly, as discussed above, the calibration transceiver transmits a sounding signal through the connected T-junction that, as discussed above, loops back to the calibration transceiver and is used to measure the phase difference of the loop back signal and the transmitted signal (step 1330). This phase difference is denoted as $\theta_{t2}$. The system then calculates the phase differences induced by the two branches connected to two antenna groups in the switcher 1030 as $\theta_t = \theta_{t1} - \theta_{t2}$ (step 1335).

The process then repeats this calibration path phase difference calculation procedure for each T-junction connecting a pair of antenna groups (step 1345) until the phase differences for each calibration path has been calculated (step 1340). As a result of calculating the pair-wise phase difference between any branches in switcher 1025, the system calculates the relative phase differences between the branches. For example, assuming the first branch has phase 0, then all other branches have phase $\varphi_i$ with respect to the previous branch (e.g., ($\varphi_i$=phase of previous branch–phase of branch i). Thereafter, the system compensates the final TX and RX phase for the switcher 1025.

FIG. 14 illustrates an example transceiver calibration system 1400 according to this disclosure. The system 1400 is an example of one embodiment of the systems 400, 700, 1000 including details of example control circuitry (e.g., controller 1405) for controlling performance of the calibration of the transceivers 1410.

In this illustrative embodiment, system 1400 includes a capture buffer 1415 that stores calibration data for retrieval by the controller 1405 for the processing and computation of phase and delay correction coefficients to be applied to the phase adjusters 1420 and the delay adjusters 1425. While the buffer 1415 is illustrated as separate from the memory 1430 for the controller 1405, in some embodiments the buffer 1415 may be implemented within the memory 1430. System 1400 further includes couplers 1435, e.g., such as couplers 414 and 424 in FIG. 4 or couplers $712_{1-N}$ in FIG. 7. For TX calibration, the couplers 1435 divert a small sample of the signal to be transmitted by the antennas 1440 and send the sample to the calibration transceiver 1445, e.g., such as the calibration transceiver 430, in FIG. 4, calibration transceiver 720 in FIG. 7, or calibration transceiver 1020 in FIG. 10. For RX calibration, the couplers 1435 inject a signal from the waveform player 1450 received via the calibration transceiver 1445 into each transceiver 1410 receiver path. For TX calibration, the calibration transceiver 1445 down-converts the RF signal from the couplers 1435 into a baseband signal. For RX calibration, the calibration transceiver 1445 up-converts a signal from the waveform player 1450 into RF and injects the signal into the couplers 1435 and consequently into the transceiver's 1410 receivers.

For example, operation during beamforming calibration for adjacent transmitter calibration includes digital TX data from modem 1455 at baseband frequencies is being processed by respective transceiver 1410 where the digital signals are converted to analog signals and up-converted to RF and propagated out each antenna 1440. The couplers 1435 each divert a sample of the TX signal to be transmitted by the antennas 1440 and send the sample signal to the calibration transceiver module via the common path 1460 for conversion to digital baseband. The capture buffer 1415 simultaneously captures both the modem input to the transceivers 1410 (REF) and the signal sampled from the couplers 1435 (FB). The controller 1405 processes the signals and determines an amount of phase and/or delay correction to apply to the phase adjusters 1420 and the delay adjusters 1425 to make the total phase and delay of each antenna path the same or more similar.

For example, operation during beamforming calibration for adjacent receiver calibration includes the controller 1405 initiating the waveform player 1450 to generate a signal stored in memory 1430. The signal is stored by the capture buffer (FB) and received by the calibration transceiver 1445 where the calibration transceiver 1445 converts the digital signal into analog and then up-converts the signal into an RF signal. The RF signal is then injected into the receiver paths of the transceivers 1410 by the couplers 1435. The transceivers 1410 down-convert the RF signals to analog and then convert the analog signals to digital baseband. The capture buffer 1415 captures both the signal (REF) from each transceiver 1410 and signal directly from the waveform player (FB). The controller 1405 processes the signals and determines an amount of phase and/or delay correction to apply to the phase adjusters 1420 and the delay adjusters 1425 to make the total phase and delay of each antenna path the same or more similar While the examples above discuss calibration of adjacent antennas, the calibration may be performed under control of the controller 1405 recursively for successive adjacent antenna pairs as discussed above for example, with regard to embodiments illustrated in FIGS. 7-9C. The calibration may also be performed under control of the controller 1405 for pairs of groups of multiple antennas as discussed above for example, with regard to embodiments illustrated in FIGS. 10-12.

Embodiments of the present disclosure provide a self-calibration scheme where calibration can be done internally with no outside interference. Moreover, the position of the T-junction between a pair of transceivers reduces or minimizes calibration error since most of the path between the transceivers and the calibration circuitry is common and the antenna transmit/receive paths are calibrated relative to adjoined antennas or groups, i.e. for any pair of antennas or antenna groups the path from the T-junction to the calibration circuitry is common to both antennas or groups. Redundant connections can also reduce the measurement error and increase robustness against transceiver failures. Embodiments of the present disclosure may be particularly useful for calibrating large antenna arrays used for MIMO+beamforming, such as in full dimension MIMO, 5G antenna arrays, and millimeter waveband antenna arrays.

None of the description in this application should be read as implying that any particular element, step, or function is an essential element that must be included in the claim scope. The scope of patented subject matter is defined only by the claims. Moreover, none of the claims are intended to invoke 35 U.S.C. § 112(f) unless the exact words "means for" are followed by a participle.

What is claimed is:

1. An apparatus for calibrating an antenna array, the apparatus comprising:
   a first coupler operably connected to a first number of antennas;
   a second coupler operably connected to a second number of antennas;
   a calibration transceiver operably connected to the first and second couplers via a common path, the common path operably connected to the first and second couplers before connection to the calibration transceiver; and
   a controller configured to perform calibration on at least one or more transmit/receive paths for the second number of antennas based on one or more signals received from or transmitted to the first and second couplers via the common path by the calibration transceiver.

2. The apparatus of claim 1, wherein to perform transmitter calibration, the controller is configured to:
   measure one or more signals to be transmitted by the first number of antennas;
   measure one or more signals to be transmitted by the second number of antennas;
   calculate a phase difference and a time delay for the one or more signals to be transmitted by the second number of antennas relative to the one or more signals to be transmitted by the first number of antennas; and
   send one or more signals to adjust at least one of a phase or a time delay of signals to be transmitted by the second number of antennas.

3. The apparatus of claim 1, wherein to perform receiver calibration, the controller is configured to:
   measure reception of one or more signals, transmitted by the calibration transceiver, by a first transceiver operably connected to the first number of antennas;
   measure reception of one or more signals, transmitted by the calibration transceiver, by a second transceiver operably connected to the second number of antennas;
   calculate a phase difference and a time delay for the one or more signals received by the second transceiver relative to the one or more signals received by the first transceiver; and
   send one or more signals to adjust at least one of a phase or a time delay of signals received by the second number of antennas.

4. The apparatus of claim 1, wherein:
   transmit/receive paths for antennas in the antenna array include a plurality of adjacent pairs of transmit/receive paths, and
   the controller is configured to recursively perform calibration on the adjacent pairs of transmit/receive paths in the antenna array by performing calibration on a transmit/receive path in a first of the adjacent pairs of transmit/receive paths relative to the other transmit/receive path in the first of the adjacent pairs of transmit/receive paths, and performing calibration on a transmit/receive path in a next of the adjacent pairs of transmit/receive paths relative to the calibrated transmit/receive path in the first of the adjacent pairs of transmit/receive paths.

5. The apparatus of claim 1, further comprising a T-junction directly connecting a first path of known length between the first coupler and the T-junction and a second path of known length between the second coupler and the T-junction to the common path operably connecting the first and second couplers to the calibration transceiver.

6. The apparatus of claim 5, further comprising:
   a third coupler operably connected to a third number of antennas, and
   a second T-junction directly connecting a third path of known length between the third coupler and the second T-junction and a fourth path of known length between the first coupler and the second T-junction to a second common path operably connecting the first and third couplers to the calibration transceiver.

7. The apparatus of claim 1, wherein the first number of antennas is one antenna, and the first coupler is coupled to and configured to sample a signal received or to be transmitted by the one antenna.

8. The apparatus of claim 1, wherein the first number of antennas is a group of multiple antennas and the first coupler is coupled to an output of a circuit operably connected the group of multiple antennas.

9. An apparatus for calibrating an antenna array, the apparatus comprising:
   a plurality of couplers, each of the couplers operably connected to an antenna in the antenna array;
   a plurality of T-junctions, each of the T-junctions operably connecting couplers for a pair of adjacent antennas to a calibration transceiver via a common path; and
   a controller configured to perform calibration on the pair of adjacent antennas based on at least one or more signals received from or transmitted to the couplers via the common path by the calibration transceiver.

10. The apparatus of claim 9, wherein to perform transmitter calibration, the controller is configured to:
    measure one or more signals to be transmitted by a first antenna in the pair of adjacent antennas;
    measure one or more signals to be transmitted by a second antenna in the pair of adjacent antennas;
    calculate a phase difference and a time delay for the one or more signals to be transmitted by the second antenna relative to the one or more signals to be transmitted by the first antenna; and send one or more signals to adjust at least one of a phase or a time delay of signals to be transmitted by the second antenna.

11. The apparatus of claim 9, wherein to perform receiver calibration, the controller is configured to:
measure reception of one or more signals, transmitted by the calibration transceiver, by a first transceiver operably connected to a first antenna in the pair of adjacent antennas;
measure reception of one or more signals, transmitted by the calibration transceiver, by a second transceiver operably connected to a second antenna in the pair of adjacent antennas;
calculate a phase difference and a time delay for the one or more signals received by the second transceiver relative to the one or more signals received by the first transceiver; and
send one or more signals to adjust at least one of a phase or a time delay of signals received by the second antenna.

12. The apparatus of claim 9, wherein:
transmit/receive paths for antennas in the antenna array include a plurality of adjacent pairs of transmit/receive paths, and
the controller is configured to recursively perform calibration on the adjacent pairs of transmit/receive paths in the antenna array by performing calibration on a transmit/receive path in a first of the adjacent pairs of transmit/receive paths relative to the other transmit/receive path in the first of the adjacent pairs of transmit/receive paths, and performing calibration on a transmit/receive path in a next of the adjacent pairs of transmit/receive paths relative to the calibrated transmit/receive path in the first of the adjacent pairs of transmit/receive paths.

13. An apparatus for calibrating an antenna array, the apparatus comprising:
a plurality of couplers, each of the couplers operably connected to a group of antennas in the antenna array;
a plurality of T-junctions, each of the T-junctions operably connecting couplers for a pair of adjacent antenna groups to a calibration transceiver via a common path; and
a controller configured to perform calibration on the pair of adjacent antenna groups based on at least one or more signals received from or transmitted to the couplers via the common path by the calibration transceiver.

14. The apparatus of claim 13, wherein to perform transmitter calibration, the controller is configured to:
measure one or more signals to be transmitted by a first antenna group in the pair of adjacent antenna groups;
measure one or more signals to be transmitted by a second antenna group in the pair of adjacent antenna groups;
calculate a phase difference and a time delay for the one or more signals to be transmitted by the second antenna group relative to the one or more signals to be transmitted by the first antenna group; and
send one or more signals to adjust at least one of a phase or a time delay of signals to be transmitted by the second antenna group.

15. The apparatus of claim 13, wherein to perform receiver calibration, the controller is configured to:
measure reception of one or more signals transmitted by the calibration transceiver by one or more first transceivers operably connected to a first antenna group in the pair of adjacent antenna groups;
measure reception of one or more signals transmitted by the calibration transceiver by one or more second transceivers operably connected to a second antenna group in the pair of adjacent antenna groups;
calculate a phase difference and a time delay for the one or more signals received by the one or more second transceivers relative to the one or more signals received by the one or more first transceivers; and
send one or more signals to adjust at least one of a phase or a time delay of signals received by the second antenna group.

16. The apparatus of claim 13, wherein:
transmit/receive paths for antenna groups in the antenna array include a plurality of adjacent pairs of transmit/receive paths, and
the controller is configured to recursively perform calibration on the adjacent pairs of transmit/receive paths in the antenna array by performing calibration on a transmit/receive path in a first of the adjacent pairs of transmit/receive paths relative to the other transmit/receive path in the first of the adjacent pairs of transmit/receive paths, and performing calibration on a transmit/receive path in a next of the adjacent pairs of transmit/receive paths relative to the calibrated transmit/receive path in the first of the adjacent pairs of transmit/receive paths.

17. A method for calibrating an antenna array, the method comprising:
at least one of receiving or transmitting, by a calibration transceiver, one or more signals to or from a first coupler operably connected to a first number of antennas and a second coupler operably connected to a second number of antennas via a common path connecting the first coupler and the second coupler to a calibration circuit, the common path operably connected to the first and second couplers before connection to the calibration transceiver; and
performing calibration on at least one or more transmit/receive paths for the second number of antennas based on the one or more signals at least one of received or transmitted via the common path.

18. The method of claim 17, wherein performing transmitter calibration comprises:
measuring one or more signals to be transmitted by the first number of antennas;
measuring one or more signals to be transmitted by the second number of antennas;
calculating a phase difference and a time delay for the one or more signals to be transmitted by the second number of antennas relative to the one or more signals to be transmitted by the first number of antennas; and
sending one or more signals to adjust at least one of a phase or a time delay of signals to be transmitted by the second number of antennas.

19. The method of claim 17, wherein performing receiver calibration comprises:
measuring reception of one or more signals transmitted by the calibration transceiver by a first transceiver operably connected to the first number of antennas;
measuring reception of one or more signals transmitted by the calibration transceiver by a second transceiver operably connected to the second number of antennas;
calculating a phase difference and a time delay for the one or more signals received by the second transceiver relative to the one or more signals received by the first transceiver; and sending one or more signals to adjust at least one of a phase or a time delay of signals received by the second number of antennas.

20. The method of claim 17, wherein:

transmit/receive paths for antennas in the antenna array include a plurality of adjacent pairs of transmit/receive paths, and performing the calibration comprises recursively perform calibration on the adjacent pairs of transmit/receive paths in the antenna array by performing calibration on a transmit/receive path in a first of the adjacent pairs of transmit/receive paths relative to the other transmit/receive path in the first of the adjacent pairs of transmit/receive paths, and performing calibration on a transmit/receive path in a next of the adjacent pairs of transmit/receive paths relative to the calibrated transmit/receive path in the first of the adjacent pairs of transmit/receive paths.

* * * * *